(12) United States Patent  (10) Patent No.: US 7,472,406 B2
Nasu  (45) Date of Patent: Dec. 30, 2008

(54) DISK DRIVE HAVING INTEGRALLY MOLDED SUPPORTING MEMBERS ON THE CHASSIS

(75) Inventor: Kazumasa Nasu, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 557 days.

(21) Appl. No.: 11/133,434

(22) Filed: May 20, 2005

(65) Prior Publication Data
US 2005/0262525 A1   Nov. 24, 2005

(30) Foreign Application Priority Data
May 21, 2004  (JP) .......................... P.2004-152251

(51) Int. Cl.
*G11B 7/085* (2006.01)
(52) U.S. Cl. ...................................... 720/679
(58) Field of Classification Search ......... 720/672–679, 720/689, 691, 697, 700
See application file for complete search history.

(56) References Cited

U.S. PATENT DOCUMENTS

| 6,351,444 | B1 * | 2/2002 | Sogawa et al. ............. 720/676 |
| 6,512,734 | B1 * | 1/2003 | Chang et al. ............... 720/675 |
| 6,567,362 | B1 | 5/2003 | Kagaya et al. |
| 6,636,473 | B1 | 10/2003 | Kagaya et al. |

| 2005/0005283 | A1 * | 1/2005 | Storz ......................... 720/675 |

FOREIGN PATENT DOCUMENTS

| EP | 1 083 552 A2 | 3/2001 |
| EP | 1 089 265 A2 | 4/2001 |
| JP | 2001-076352 | 6/2000 |
| JP | 2001-076352 A | 3/2001 |
| JP | 2002-100131 | 4/2002 |
| JP | 2002-222571 | 8/2002 |

OTHER PUBLICATIONS

Machine translation of JP 2002-222571.*

* cited by examiner

*Primary Examiner*—Joseph H. Feild
*Assistant Examiner*—Nathan Danielsen
(74) *Attorney, Agent, or Firm*—Morgan, Lewis & Bockius LLP

(57) ABSTRACT

A disk drive in which a turntable-equipped spindle motor is provided at the front part of a metal plate-made chassis, an optical pick-up is arranged in a central aperture of the chassis, ends of the both right and left pairs of guide shafts and movably supporting the optical pick-up are engaged with the four supporting members on the chassis, the torsion coil spring is engaged between the ends of each of the guide shafts and the chassis, the front end of a height adjusting screw fixed together with the thread groove of the chassis against each of the torsion coil springs is pressed to the ends of each of the guide shafts and a part left after cutting during press-molding the chassis is pulled up and folded appropriately, thereby integrally molding four supporting members on the chassis.

4 Claims, 8 Drawing Sheets

US 7,472,406 B2

DISK DRIVE HAVING INTEGRALLY MOLDED SUPPORTING MEMBERS ON THE CHASSIS

BACKGROUND OF THE INVENTION

1. Field of the Invention

The present invention relates to a disk drive for reproducing, recording or erasing a disk such as DVD, for example.

2. Description of the Related Art

A technology of the disk drive according to the prior art is that described in JP-A-2001-76352. As shown in FIG. 10 through FIG. 13, a disk drive, wherein a metal chassis 3 is supported via an elastic body 2 on a housing 1 so as to be movable vertically, a turntable 4-equipped spindle motor 5 is provided at the front part of the chassis 3, an optical pick-up 6 is arranged in a central aperture 3a of the chassis 3, four synthetic resin-made supporting members 8A through 8D are outsert-molded on the chassis 3 opposite the ends of the ends of both right and left guide shafts 7A and 7B for movably supporting the optical pick-up 6, both ends of each of the guide shafts 7A and 7B are engaged with each of the supporting members, 8A to 8D, a torsion coil spring 9 is engaged between ends of each of the guide shafts 7A and 7B and the chassis 3, the front end of a height adjusting screw 10 fixed together with the thread groove 3b of the chassis 3 against each of the torsion coil springs 9 is pressed to the ends of each of the guide shafts 7A and 7B by which the optical pick-up 6 is fixed via each of the guide shafts 7A and 7B to the chassis 3 in a way movable in the direction shown by the arrow a and b, and a feeding motor 12 linked and connected to the optical pick-up 6 via a driving mechanism 11 consisting of nut part 11a, screw axis 11b and gear 11c is provided on the side of the chassis 3.

The procedures will be described as follows: The chassis 3 is moved upward and kept horizontal, by which a disk D on a tray (not illustrated) is placed on a turntable 4, a spindle motor 5 is used to rotate the disk D at a high speed via the turntable 4, a feeding motor 12 is used to move an optical pick-up 6 toward the direction shown by arrow a and b via a driving mechanism 11 along both guide shafts 7A and 7B and the laser beam is emitted from the optical pick-up 6 to the disk D to read the information recorded on the disk D.

At the stage of final adjustment prior to shipment from a factory, each height adjusting screw 10 is turned to adjust the height (t) of the ends of each of the guide shafts 7A and 7B by which the optical pick-ups 6 are individually adjusted for gradient angle in the radial direction R (refer to FIG. 11 and FIG. 12) along the longitudinal direction of the guide shafts 7A and 7B and in the tangent direction T (refer to FIG. 13) along the transverse direction of the guide shafts 7A and 7B so that the laser beam can be emitted from the optical pick-up 6 to the disk D at a right angle.

In the above-described conventional construction where each of supporting members 8A through 8D is outsert-molded on the chassis 3, the number of parts increases with an increasing number of these supporting members, 8A through 8D, resulting in a higher production cost. Further, torsion coil springs 9 must be individually engaged between ends of guide shafts 7A and 7B and the chassis 3, which requires additional labor and time to result in a less-efficient assembly work.

SUMMARY OF THE INVENTION

The present invention has been made, with the above conventional problems taken into account, and an object of the invention is to provide a disk drive which requires a smaller number of parts to realize an efficient assembly work.

In order to attain the above object, according to a first aspect of the invention, there is provided a disk drive in which a turntable-equipped spindle motor is provided at the front part of a metal plate-made chassis, an optical pick-up is arranged in a central aperture of the chassis, four supporting members are outsert-molded on the chassis opposite the ends of the both right and left pairs of guide shafts movably supporting the optical pick-up, both ends of each guide shaft are engaged with each supporting member, torsion coil spring is engaged between the end of each guide shaft and the chassis, the front end of a height adjusting screw fixed together with the thread groove of the chassis against each torsion coil spring is pressed to the end of each guide shaft, by which the optical pick-up is adjusted for gradient angle toward the radial direction and the tangent direction via each guide shaft, a disk is rotated via the turntable by the spindle motor, the optical pick-up is moved via the driving mechanism by a feeding motor mounted on the chassis along the both guide shafts, the laser beam is emitted to the disk from the optical pick-up to read the information recorded on the disk, the disk drive, wherein in place of four supporting members outsert-molded, a part left after cutting during press-molding the chassis is pulled up and folded appropriately, thereby forming four integrally supporting members on the chassis, each of the supporting members is provided with a guide shaft engaging part for allowing the end of each guide shaft to be engaged and a spring engaging part for allowing each torsion coil spring to be engaged, each of the engaging parts is provided with a vertical filler erecting from the chassis and a horizontal filler extending laterally from the front end of the vertical filler, a concave groove is formed at the lower edge of each of the horizontal fillers, a corner extending from the upper edge of each of the horizontal fillers to the lower edge is cut, for which an inclined guide edge is formed, the torsion coil spring is provided with a coil part, a pair of spring legs extending from both ends of the coil part in an approximately reverse-V shape in a mutually opposite way at a certain facing angle, a pair of contacting parts folded in an approximately V shape in a mutually opposite way along the direction intersecting the axial center of the coil part at an approximately right angle from the front end of each of the spring legs and running almost in parallel, an approximately V-shaped stopper part folded outwardly in an approximately V-shape along the direction intersecting the axial center of the coil part at an approximately right angle from the front end of one of the contacting parts and an approximately L-shaped stopper part folded in an approximately L-shape along the direction almost in parallel with the axial center of the coil part from the front end of the other contacting part, the coil part is fitted outside the end of each guide shaft, one of the contacting parts is engaged with an engaging part of the chassis and brought into contact with the lower edge of the engaging part at a facing angle of approximately 45°, the other contacting part is moved along the inclined guide edge from the upper edge of each horizontal filler to the lower edge, fitted into the concave groove, and brought into contact with the lower edge of the concave groove at a facing angle of approximately 45°.

According to a second aspect of the invention, there is provided a disk drive in which a turntable-equipped spindle motor is provided at the front part of a metal plate-made chassis, an optical pick-up is arranged in a central aperture of the chassis, ends of both right and left pairs of guide shafts movably supporting the optical pick-up are engaged with four supporting members on the chassis, the front end of a height adjusting screw fixed together with the thread groove of the chassis against the torsion coil spring engaged with the end of each guide shaft is pressed to the end of each guide shaft, by which the optical pick-up is adjusted for gradient angle toward the radial direction and the tangent direction via each guide shaft, a disk is rotated via the turntable by the spindle motor, the optical pick-up is moved via the driving mechanism by a feeding motor mounted on the chassis along the both guide shafts, the laser beam is emitted to the disk from the optical pick-up to read the information recorded on the disk, the disk drive, wherein the four supporting members are integrally molded on the chassis by pulling up and folding appropriately a part left after cutting during press-molding the chassis.

According to a third aspect of the invention, there is provided a disk drive according to the second aspect of the invention, wherein the torsion coil spring is provided with a coil part, a pair of spring legs extending from both ends of the coil part in an approximately reverse-V shape in a mutually opposite way at a certain facing angle, and a pair of contacting parts folded in an approximately V shape in a mutually opposite way along the direction intersecting the axial center of the coil part at an approximately right angle from the front end of each of the spring legs and running almost in parallel, the coil part is fitted outside the end of each guide shaft, one of the contacting parts is engaged with an engaging part of the chassis and brought into contact with the lower edge of the engaging part at a facing angle of approximately 45°, the other contacting part is fitted into the concave groove of each supporting member and brought into contact with the lower edge of the concave groove at a facing angle of approximately 45°.

According to a fourth aspect of the invention, there is provided a disk drive according to the third aspect of the invention, which is provided with an approximately V-shaped stopper part folded outwardly in an approximately V-shape along the direction intersecting the axial center of the coil part at an approximately right angle from the front end of one of the contacting parts and an approximately L-shaped stopper part folded in an approximately L-shape along the direction almost in parallel with the axial center of the coil part from the front end of the other contacting part.

According to a fifth aspect of the invention, there is provided a disk drive according to the third or the fourth aspect of the invention, wherein each of the supporting members is provided with a guide shaft engaging part for allowing the end of each guide shaft to be engaged and a spring engaging part for allowing each torsion coil spring to be engaged, each of the engaging parts is provided with a vertical filler erecting from the chassis and a horizontal filler extending laterally from the front end of the vertical filler, a corner extending from the upper edge of each of the horizontal fillers to the lower edge is cut, by which an inclined guide edge is formed, the other contacting part of each torsion coil spring is moved along the inclined guide edge from the upper edge of each horizontal filler to the lower edge and fitted into the concave groove.

According to the first aspect of the invention, four supporting members for supporting both ends of each guide shaft are integrally molded on the chassis, thereby requiring a smaller number of parts, depending on the number of supporting members, for production at a lower cost than a conventional case where each of the supporting members are outsert-molded.

Further, the coil part of each torsion coil spring is fitted outside the end of each guide shaft, and a pair of contacting parts extending from the coil part are respectively brought into contact with the engaging part of the chassis and the end of the concave groove of each supporting member at a facing angle of approximately 45°. Therefore, even where an excessive load is given to each guide shaft to nearly displace the guide shafts from the height adjusting screw, a sufficiently large reaction force against the excessive load is generated at each contacting part, by which each guide shaft can be pressed so as not to be displaced from the height adjusting screw accidentally.

In addition, since an approximately V-shaped stopper part and an approximately L-shaped stopper part extending from the front end of the contacting part are used to prevent each of the contacting parts from being accidentally dropped off from the engaging part or the concave groove and both of the stopper parts are folded in a different direction, it is possible to easily confirm the direction of the torsion coil spring only by visually inspecting the folded direction. For example, the approximately L-shaped stopper part is caught, thereby allowing the coil part to be fitted normally into the end of each guide shaft, or the approximately V-shaped stopper part is caught, thereby preventing a wrong fitting that the coil part is fitted reversely into the end of each guide shaft, so that the torsion coil spring can be assembled efficiently.

Furthermore, since a corner extending from the upper edge of the horizontal filler of each spring engaging part to the lower edge is cut so as to form an inclined guide edge, it is possible to move the other contacting part of each torsion coil spring along the inclined guide edge from the upper edge of the horizontal filler to the lower edge and easily fit it into the concave groove.

According to the second aspect of the invention, four supporting members for supporting both ends of each guide shaft are integrally molded on the chassis, thereby requiring a smaller number of parts, depending on the number of supporting members, for production at a lower cost than a conventional case where each of the supporting members are outsert-molded.

According to the third aspect of the invention, the coil part of each torsion coil spring is fitted outside the end of each guide shaft, and a pair of contacting parts extending from the coil part are respectively brought into contact with the engaging part of the chassis and the lower edge of the concave groove of each supporting member at a facing angle of approximately 45°. Therefore, even where an excessive load is given to each guide shaft to nearly displace the guide shaft from the height adjusting screw, a sufficiently large reaction force against the excessive load is generated at each contacting part, by which each guide shaft can be pressed so as not to be displaced from the height adjusting screw accidentally.

According to the fourth aspect of the invention, since an approximately V-shaped stopper part and an approximately L-shaped stopper part extending from the front end of each contacting part can prevent each of the contacting parts from being accidentally dropped off from the engaging part or the concave groove and both of the stopper parts are folded in a different direction, it is possible to easily confirm the direction of the torsion coil spring only by visually inspecting the folded direction. For example, the approximately L-shaped stopper part is caught, thereby allowing the coil part to be fitted normally into the end of each guide shaft, or the approximately V-shaped stopper part is caught, thereby preventing a wrong fitting that the coil part is fitted reversely into the end of each guide shaft, so that the torsion coil spring can be assembled efficiently.

According to the fifth aspect of the invention, since a corner extending from the upper edge of the horizontal filler of each spring engaging part to the lower edge is cut, by which an inclined guide edge is formed, it is possible to move the other contacting part of each torsion coil spring along the inclined guide edge from the upper edge of the horizontal filler to the lower edge and easily fit it into the concave groove.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Figure 1:
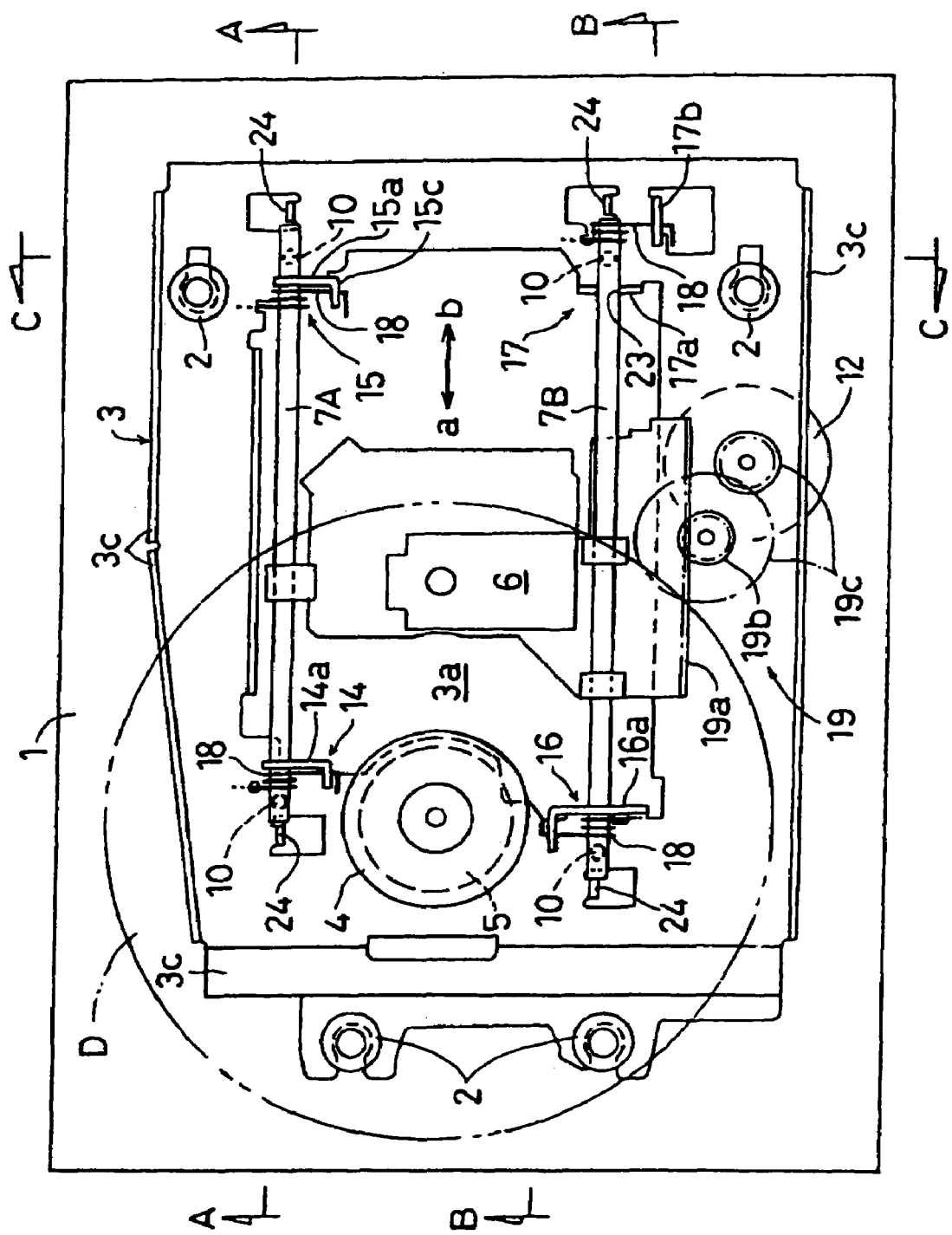
FIG. 1 is a schematic plan view of the disk drive of an embodiment of the present invention.

FIG. 1 through FIG. 5 show a disk drive of an embodiment of the present invention, and a first supporting member through a fourth supporting member (14 through 17) are integrally molded on the chassis 3, four torsion coil springs 18 are engaged with the ends of each of the guide shafts 7A and 7B and the front ends of the four height adjusting screws 10 are pressed to the lower surface of both ends of each of the guide shafts 7A and 7B and a feeding motor 12 is linked and connected to an optical pick-up 6 via a driving mechanism 19 consisting of rack 19a, pinion 19b and gear 19c. The construction other than the above is similar to that described in FIG. 10 through FIG. 13, and the same symbols are given to the same parts to omit description thereof.

Figure 6:
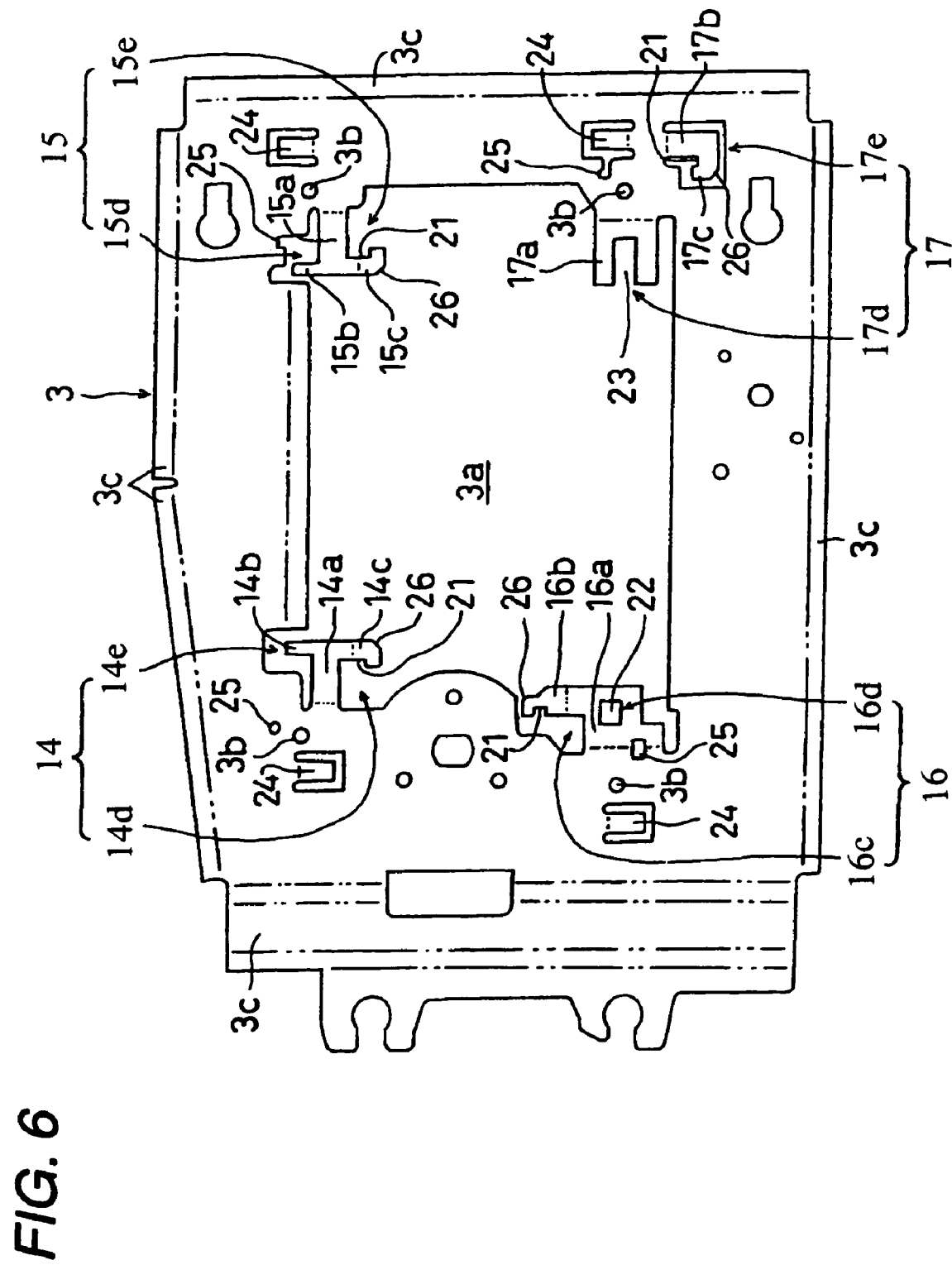
FIG. 6 is a development view of the chassis.

As shown in the development view of FIG. 6, the chassis 3 is made by forming a metal plate into a predetermined shape, the peripheral edge is folded to provide a reinforced frame 3c, a part left after cutting during press-molding the chassis 3 is pulled up and folded appropriately, thereby integrally molding the first supporting member through the fourth supporting member (14 through 17) on the chassis 3.

Figure 2:
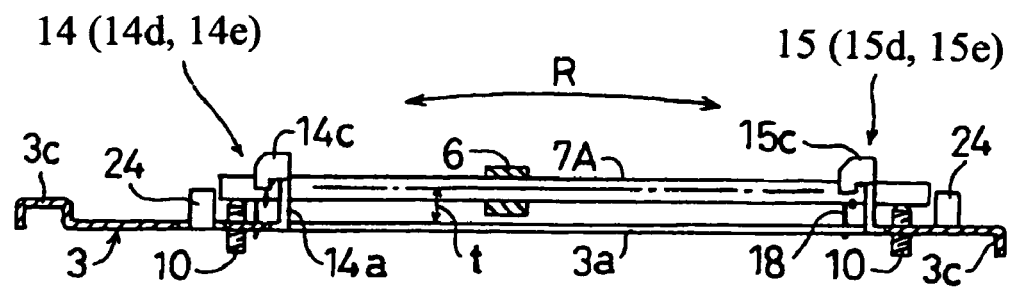
FIG. 2 is a section view from arrow direction (A-A) in FIG. 1.
Figure 5:
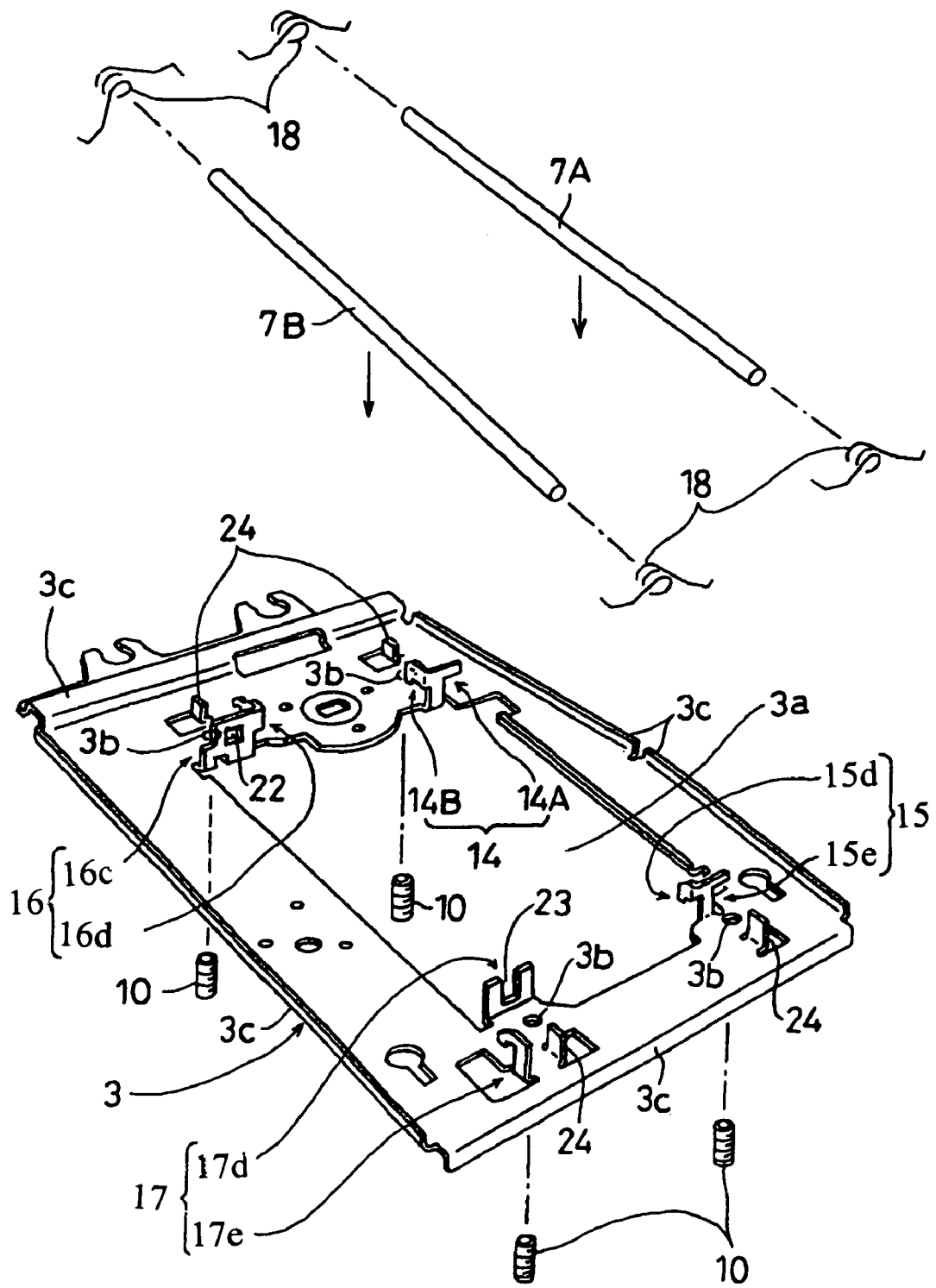
FIG. 5 is an exploded perspective view of the above disk drive.

As shown in FIG. 2, FIG. 5 and FIG. 6, the first supporting member 14 is provided with a vertical filler 14a erecting from the chassis 3 and a pair of horizontal fillers, 14b and 14c, extending toward both sides from the front end of the vertical filler 14a, a guide shaft engaging part 14d is formed by the vertical filler 14a and the horizontal filler 14b for allowing one end of one of the guide shafts 7A to be engaged, a spring engaging part 14e is formed by the vertical filler 14a and the horizontal filler 14c for allowing the torsion coil spring 18 to be engaged, and a concave groove 21 is formed on the lower edge of the horizontal filler 14c.

As shown in FIG. 2, and FIG. 4 through FIG. 6, the second supporting member 15 is provided with a vertical filler 15a erecting from the chassis 3 and a pair of horizontal fillers, 15b and 15c, extending toward both sides from the front end of the vertical filler 15a, a guide shaft engaging part 15d is formed by the vertical filler 15a and the horizontal filler 15b for allowing the other end of one of the guide shafts 7A, an engaging part 15e is formed by the vertical filler 15a and the horizontal filler 15c for allowing the torsion coil spring 18 to be engaged, and a concave groove 21 is formed on the lower edge of the horizontal filler 15c.

Figure 3:
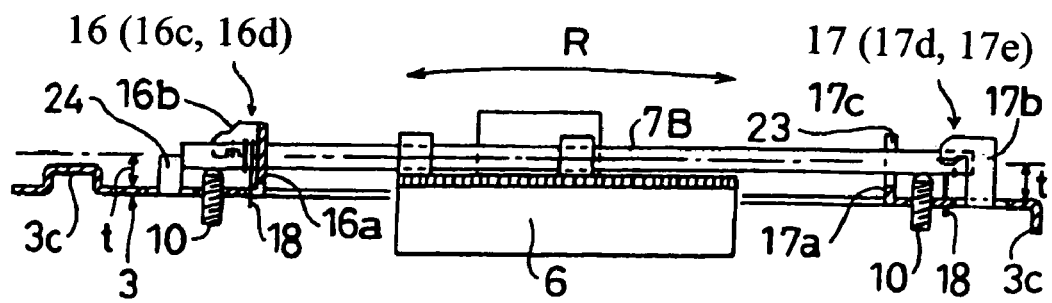
FIG. 3 is a section view from arrow direction (B-B) in FIG. 1.
Figure 4:
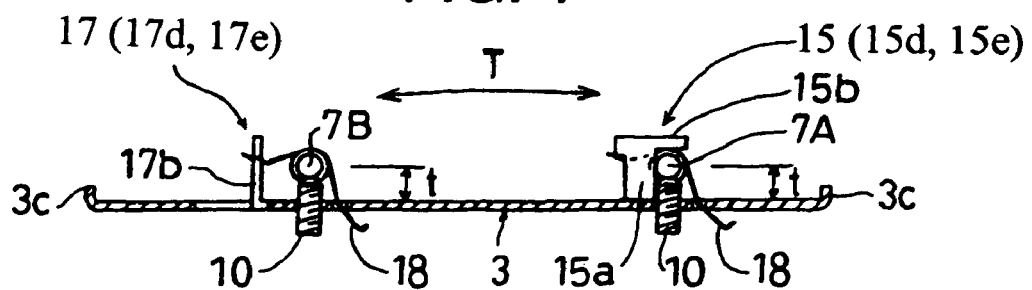
FIG. 4 is a section view from arrow direction (C-C) in FIG. 1.

As shown in FIG. 3, FIG. 5 and FIG. 6, the third supporting member 16 is provided with a vertical filler 16a erecting from the chassis 3 and a horizontal filler 16b extending laterally from the front end of the vertical filler 16a, a guide shaft engaging part 16c is formed for allowing one end of the other guide shaft 7B to be engaged by a rectangular engaging aperture 22 penetrated and installed on the vertical filler 16a, a spring engaging part 16d is formed for allowing the torsion coil spring 18 to be engaged by the vertical filler 16a and the horizontal filler 16b, and a concave groove 21 is formed on the lower edge of the horizontal filler 16b.

As shown in FIG. 3 through FIG. 6, the fourth supporting member 17 is provided with a pair of vertical fillers, 17a and 17b, erecting from the chassis 3, a guide shaft engaging part 17d is formed for allowing the other end of the other guide shaft 7B to be engaged by a concave part 23 recessed on the upper edge of the vertical filler 17a, a spring engaging part 17e is formed for allowing the torsion coil spring 18 to be engaged by the vertical filler 17b and horizontal filler 17c extending laterally from the front end of the vertical filler 17b, and a concave groove 21 is formed on the lower edge of the horizontal filler 17c. Further, 24 denotes a guide shaft stopper cut out from the chassis 3, and 25 denotes an engaging part for the torsion coil spring formed on the chassis 3.

According to the above-described construction, since the four supporting members (14 through 17) for supporting both ends of the guide shaft, 7A and 7B, are integrally molded on the chassis 3, it is possible to reduce the number of parts, depending on the number of the supporting members (14 through 17), for production at a lower cost than a conventional case where these supporting members (14 through 17) are outsert-molded.

Figure 7A:
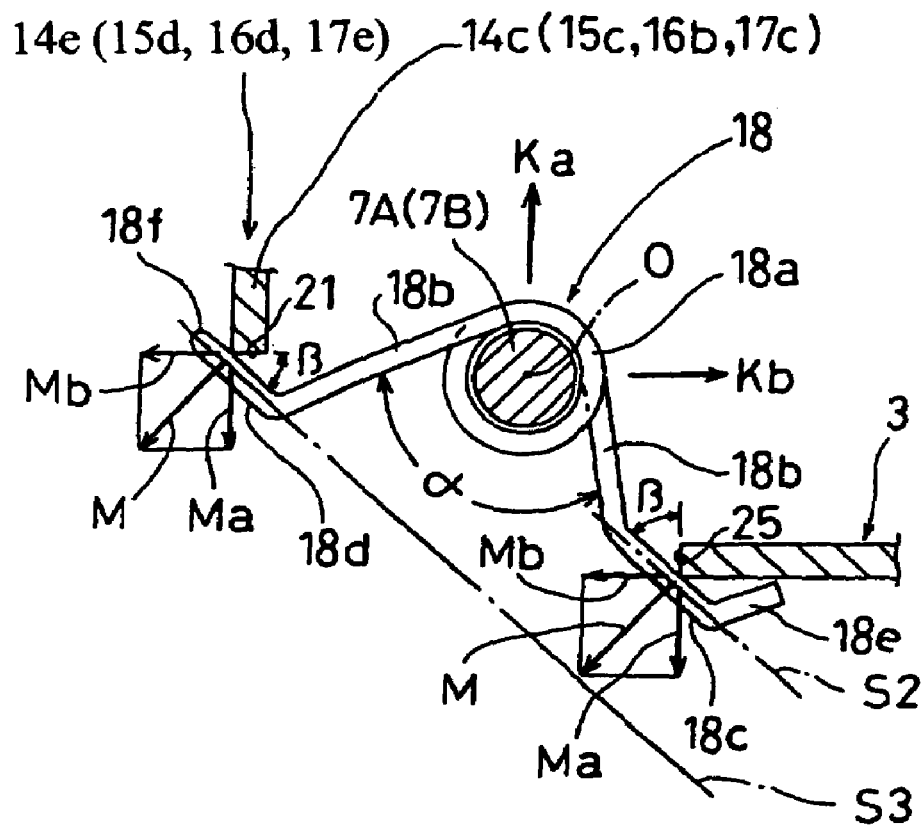
FIG. 7A is a side view of the torsion coil spring and FIG. 7B is a plan view of the torsion coil spring.
Figure 7B:
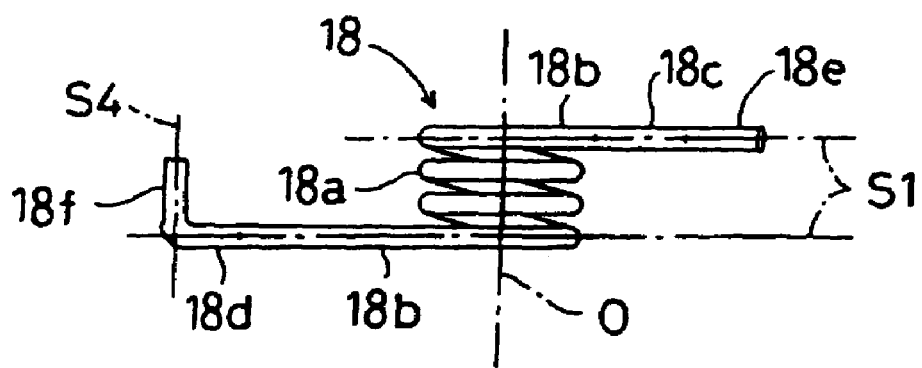

As shown in FIGS. 7A and 7B, the torsion coil spring 18 is provided with a coil part 18a, a pair of spring legs 18b extending from both ends of the coil part 18a in an approximately reverse-V shape in a mutually opposite way at a certain facing angle α, a pair of contacting parts, 18c and 18d, folded in an approximately V shape in a mutually opposite way along a virtual line S1 intersecting the axial center O of the coil part 18a at an approximately right angle from the front end of each of the spring legs 18b and running almost in parallel (refer to the virtual lines S2 and S3), an approximately V-shaped stopper part 18e folded outwardly in an approximately V-shape along the virtual line S1 intersecting the axial center O of the coil part 18a at an approximately right angle from the front end of the contacting part 18c and an approximately L-shaped stopper part 18f folded in an approximately L-shape along the virtual line S4 almost in parallel with the axial center O of the coil part 18a from the front end of the contacting part 18d, the coil part 18a is fitted outside the ends of each of the guide shafts 7A and 7B while the contacting part 18c is engaged with an engaging part 25 of the chassis 3 and brought into contact with the lower edge of the engaging part 25 at a facing angle β of approximately 45°, the contacting part 18d is fitted into a concave groove 21 of horizontal fillers 14c (15c, 16b and 17c) of each of the spring engaging parts, 14e, 15e, 16d, and 17e, and brought into contact with the edge of the concave groove 21 at a facing angle β of approximately 45°, by which both ends of the guide shafts 7A and 7B are respectively pressed to the front ends of the four height adjusting screws 10.

Figure 8A:
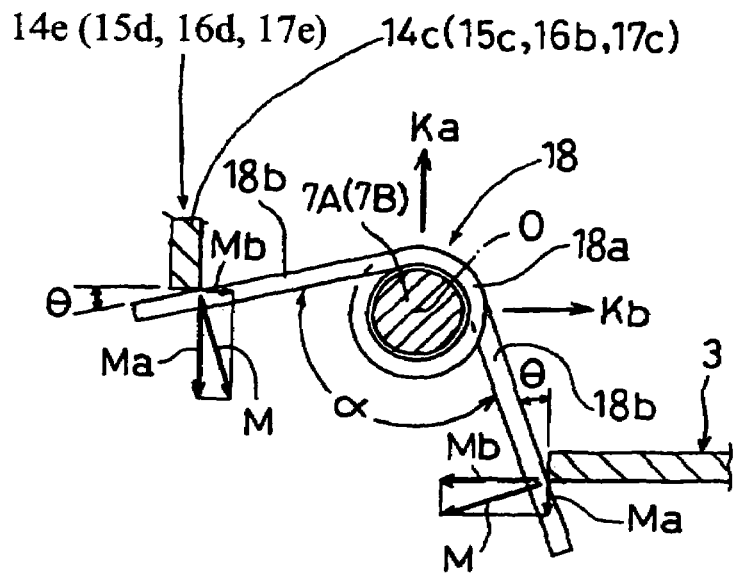
FIG. 8A is a side view of a comparative example of the torsion coil spring and FIG. 8B is a plan view of the comparative example.
Figure 8B:
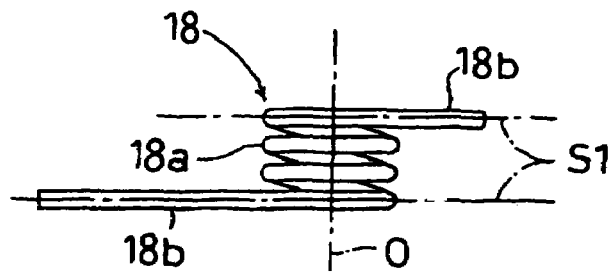

In this instance, as shown in a comparative example of FIGS. 8A and 8B, where the coil part 18a of each torsion coil spring 18 is fitted outside the ends of each of the guide shafts 7A and 7B and each of the spring legs 18b is also engaged with the engaging part 25 of the chassis 3 and the concave groove 21 of the spring engaging parts, 14e, 15e, 16d, and 17e, a small facing angle θ is formed between the spring leg 18b and the lower edge of the engaging part 25 and between the spring leg 18b and the concave groove 21, thereby giving an excessive load, Ka or Kb, to each of the guide shafts 7A and 7B. When the guide shafts 7A and 7B are nearly displaced from the height adjusting screw 10, balance between the vertical component force Ma and the horizontal component force Mb of the reaction force M against the excessive load, Ka or Kb is inferior, and the guide shafts 7A and 7B may be displaced from the height adjusting screw 10 accidentally.

In order to cope with the above problem, according to the present invention, as shown in FIGS. 7A and 7B, the coil part 18a of each torsion coil spring 18 is fitted outside the ends of each of the guide shafts 7A and 7B and a pair of contacting parts, 18c and 18d, extending from the coil part 18a are respectively brought into contact with engaging part 25 of the chassis 3 and the lower edge of the concave groove 21 of each of the supporting members, 14 through 17, at a facing angle β of approximately 45°. Even when an excessive load, Ka or Kb, is given to each of the guide shafts 7A and 7B to nearly displace these shafts 7A and 7B from the height adjusting screw 10, a sufficiently large reaction force M is generated against the excessive load, Ka or Kb, at each of the contacting parts, 18c and 18d, and the vertical component force Ma and the horizontal component force Mb of the reaction force M is favorably balanced to press the guide shafts 7A and 7B so as not to be displaced from the height adjusting screw 10 accidentally.

In addition, since an approximately V-shaped stopper part 18e and an approximately L-shaped stopper part 18f extending from the front end of the contacting parts, 18c and 18d, can prevent each of the contacting parts, 18c and 18d, from being accidentally dropped off from the engaging part 25 or the concave groove 21 and both of the stopper parts, 18e and 18f, are folded in a different direction, it is possible to easily confirm the direction of the torsion coil spring 18 only by visually inspecting the folded direction. For example, the approximately L-shaped stopper part 18f is caught, thereby allowing the coil part 18a to be fitted normally into the ends of each of the guide shafts 7A and 7B or the approximately V-shaped stopper part 18e is caught, thereby preventing a wrong fitting that the coil part 18a is fitted reversely into the ends of each of the guide shafts 7A and 7B so that the torsion coil spring 18 can be assembled efficiently.

Figure 9:
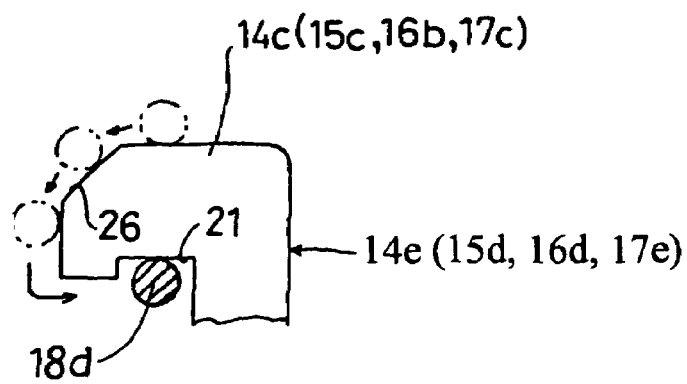
FIG. 9 is a side view of the major part.
Figure 10:
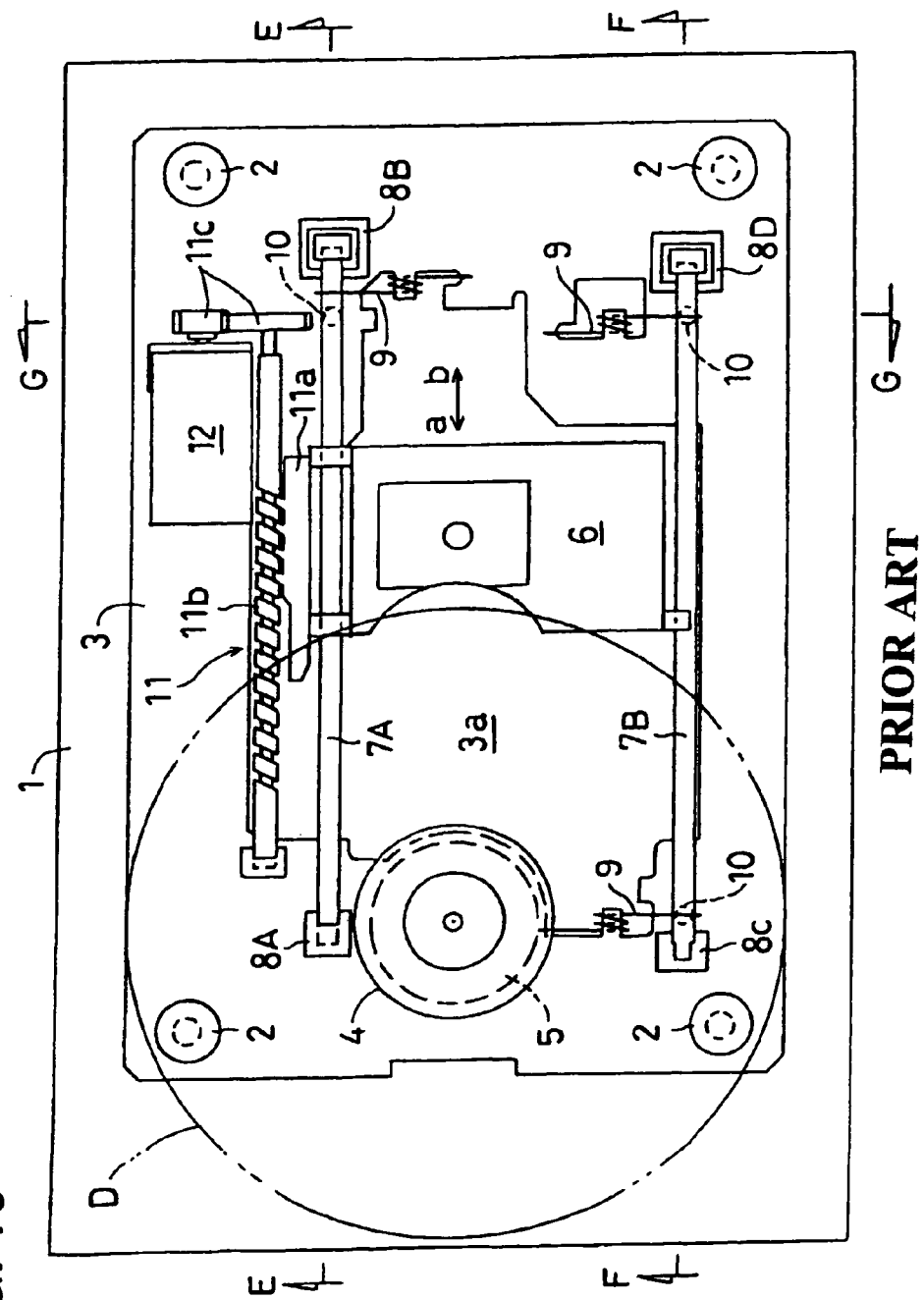
FIG. 10 is a schematic plan view illustrating the conventional example.
Figure 11:
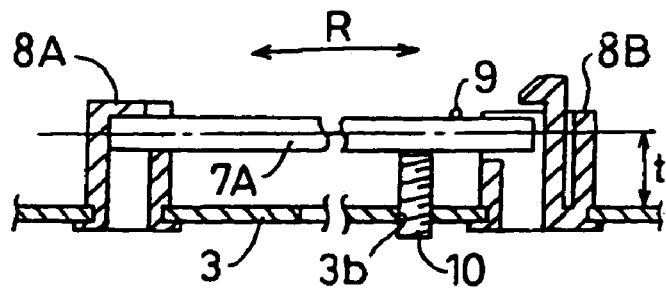
FIG. 11 is a section view from the arrow direction of (E-E) in FIG. 10.
Figure 12:
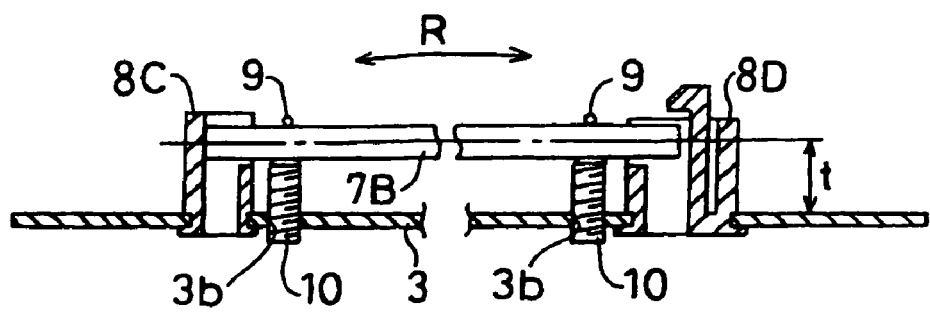
FIG. 12 is a section view from the arrow direction of (F-F) in FIG. 10.
Figure 13:
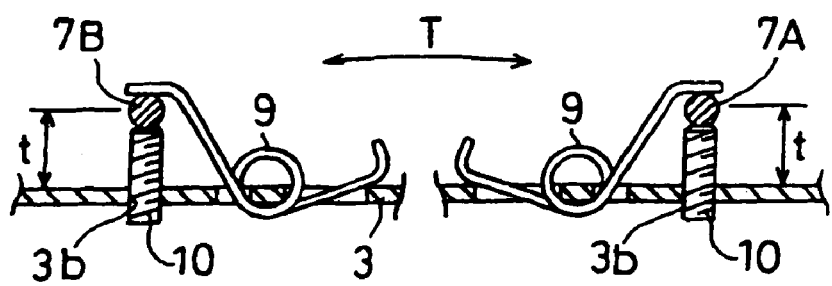
FIG. 13 is a section view from the arrow direction of (G-G) in FIG. 10.

As shown in FIG. 9, since a corner extending from the upper edge of the horizontal fillers, 14c, 15c, 16b and 17c, of the spring engaging parts, 14e, 15e, 16d, and 17e, to the lower edge is cut so as to form an inclined guide edge 26, it is possible to smoothly move the other contacting part 18d of each torsion coil spring 18 along the inclined guide edge 26 from the upper edge of the horizontal fillers, 14c, 15c, 16b and 17c to the lower edge and easily fit it into the concave groove 21.

What is claimed is:

1. A disk drive comprising:

a turntable-equipped spindle motor that is provided at a front part of a metal plate-made chassis;

an optical pick-up that is arranged in a central aperture of the chassis;

four integral supporting members that are formed on the chassis at a first end and a second end of each of a right guide shaft and a left guide shaft movably supporting the optical pick-up, and are engaged with both ends of each guide shaft;

a plurality of torsion coil springs that are engaged between both the first end and the second end of both the right guide shaft and the left guide shaft, and the chassis;

a plurality of height adjusting screws, each height adjusting screw fixed together with a thread groove of the chassis against one of the torsion coil springs;

a feeding motor mounted on the chassis;

guide shaft engaging parts for allowing the end of each guide shaft to be engaged;

spring engaging parts for allowing each torsion coil spring to be engaged;

a plurality of vertical fillers that are erected from the chassis;

a plurality of horizontal fillers, one of which extends laterally from a front end of each of the vertical fillers;

a concave groove that is formed at a lower edge of each of the horizontal fillers;

an inclined guide edge;

a plurality of coil parts, each coil part having a first coil part end and a second coil part end;

a first spring leg and a second spring leg extending from the first coil part end and the second coil part end, respectively, of the coil part in an approximately reverse-V shape in a mutually opposite way at a certain facing angle;

a plurality of pairs of contacting parts, each part of each pair of contacting parts folded in an approximately V shape in a mutually opposite way from the other part of the pair of contacting parts along the direction intersecting the axial center of the coil part, with one contacting part of each pair of contacting parts folded at an approximately right angle from a front end of each of the first spring leg and the second spring leg, and each pair of contacting parts running almost in parallel to each other, a plurality of pairs of approximately V-shaped stopper parts, each pair of approximately V-shaped stopper parts being folded outwardly in an approximately V-shape along the direction intersecting the axial center of one of the coil parts at an approximately right angle from a front end of the other one of each pair of contacting parts; and a plurality of pairs of approximately L-shaped stopper parts, each stopper part of a pair of stopper parts folded in an approximately L-shape along a direction almost in parallel with an axial center of one of the coil parts from a front end of one of the approximately V-shaped contacting parts, wherein:

a front end of one of the height adjusting screws is pressed to each of the first end and the second end of each of the right guide shaft and the left guide shaft, by which the optical pick-up is adjusted for gradient angle toward a radial direction and a tangent direction via each of the right guide shaft and the left guide shaft;

a disk is rotated via the turntable by the spindle motor;

the optical pick-up is moved via a driving mechanism by the feeding motor along the right guide shaft and the left guide shaft;

a laser beam is emitted to the disk from the optical pick-up to read information recorded on the disk;

four parts formed by a cutting during press-molding of the chassis are pulled up and folded appropriately, thereby forming the four integral supporting members on the chassis;

each of the supporting members is provided with one each of the guide shaft engaging and the spring engaging parts;

each of the engaging parts is provided with one each of the vertical fillers and the horizontal fillers;

a corner extending from an upper edge to the lower edge of each of the horizontal fillers is cut, for which the inclined guide edge is formed;

each torsion coil spring is provided with one of the coil parts, one of the first and second spring legs, one of the pairs of contacting parts, one of the approximately V-shaped stopper parts, and one of the approximately L-shaped stopper parts;

each coil part is fitted outside the end of one of the guide shafts;

one contacting part of each of the pairs of contacting parts is engaged with an engaging part of the chassis and brought into contact with the lower edge of the engaging part at a facing angle of approximately 45°; and the other contacting part of each of the pairs of contacting parts is moved along the inclined guide edge from the upper edge of each horizontal filler to the lower edge, fitted into the concave groove, and brought into contact with the lower edge of the concave groove at a facing angle of approximately 45°.

2. A disk drive comprising:

a turntable-equipped spindle motor that is provided at a front part of a metal plate-made chassis;

an optical pick-up that is arranged in a central aperture of the chassis;

four integral supporting members that are formed on the chassis at a first end and a second end of each of a right guide shaft and a left guide shaft movably supporting the optical pick-up, and are engaged with both ends of each guide shaft;

a plurality of height adjusting screws;

a plurality of thread grooves;

a plurality of torsion coil springs;

a feeding motor that is mounted on the chassis;

a plurality of coil parts, each coil part having a first coil part end and a second coil part end;

a first spring leg and a second spring leg extending from the first coil part end and the second coil part end, respectively, of the coil part in an approximately reverse-V shape in a mutually opposite way at a certain facing angle; and a plurality of pairs of contacting parts, each part of each pair of contacting parts folded in an approximately V shape in a mutually opposite way from the other part of the pair of contacting parts along the direction intersecting the axial center of the coil part, with one contacting part of each pair of contacting parts at an approximately right angle from a front end of each of the first spring leg and the second spring leg, and each pair of contacting parts running almost in parallel to each other, wherein, a front end of one of the height adjusting screws is pressed to each of the first end and the second end of each of the right guide shaft and the left guide shaft, by which the optical pick-up is adjusted for gradient angle toward a radial direction and a tangent direction via each of the right guide shaft and the left guide shaft;

a disk is rotated via the turntable by the spindle motor;

the optical pick-up is moved via a driving mechanism by the feeding motor along the right guide shaft and the left guide shaft;

a laser beam is emitted to the disk from the optical pick-up to read information recorded on the disk;

the four supporting members are integrally formed on the chassis by pulling up and folding appropriately a part remaining after cutting during press-molding of the chassis;

each torsion coil spring is provided with one of the coil parts, one of the first and second spring legs, and one of the pairs of contacting parts;

each coil part is fitted outside the end of one of the guide shafts;

one contacting part of each of the pairs of contacting parts is engaged with an engaging part of the chassis and brought into contact with the lower edge of the engaging part at a facing angle of approximately 45°; and the other contacting part of each of the pairs of contacting parts is moved along the inclined guide edge from the upper edge of each horizontal filler to the lower edge, fitted into the concave groove, and brought into contact with the lower edge of the concave groove at a facing angle of approximately 45°.

3. A disk drive according to claim 2, further comprising:

a plurality of pairs of approximately V-shaped stopper parts, each pair being folded outwardly in an approximately V-shape along the direction intersecting the axial center of one of the coil parts at an approximately right angle from a front end of the other one of each pair of contacting parts; and a plurality of pairs of approximately L-shaped stopper parts, each stopper part of a pair of stopper parts folded in an approximately L-shape along a direction almost in parallel with an axial center of one of the coil parts from a front end of one of the approximately V-shaped contacting parts.

4. A disk drive according to claim 2, further comprising:

a plurality of guide shaft engaging parts for allowing each of the first end and the second end of each of the right guide shaft and the left guide shaft to be engaged;

spring engaging parts for allowing each torsion coil spring to be engaged;

a plurality of vertical fillers that are erected from the chassis;

a plurality of horizontal fillers, one of which extends laterally from a front end of each of the vertical fillers; and an inclined guide edge, wherein each of the supporting members is provided with one each of the guide shaft engaging and the spring engaging parts;

each of the engaging parts is provided with one each of the vertical fillers and the horizontal fillers;

a corner extending from an upper edge to the lower edge of each of the horizontal fillers is cut, for which the inclined guide edge is formed; and the other contacting part of each torsion coil spring is moved along the inclined guide edge from the upper edge of each horizontal filler to the lower edge and fitted into the concave groove.

\* \* \* \* \*